United States Patent [19]

Niehaus

[11] Patent Number: 4,516,706
[45] Date of Patent: May 14, 1985

[54] SPARE TIRE COVER

[76] Inventor: Roy G. Niehaus, 3611½ Ponciana Dr., Akron, Ohio 44319

[21] Appl. No.: 519,976

[22] Filed: Aug. 3, 1983

[51] Int. Cl.³ .............................................. B62D 43/02
[52] U.S. Cl. ................................ 224/42.2; 225/42.25; 296/37.3
[58] Field of Search ................. 296/37.2, 37.3; 70/58, 70/258, 259, 159, DIG. 34, 171; 150/52 K; 224/42.2, 42.06, 42.25, 42.24

[56] References Cited

U.S. PATENT DOCUMENTS

| | | | |
|---|---|---|---|
| 1,399,379 | 12/1921 | Currier | 224/42.25 |
| 1,618,924 | 2/1927 | Hanton | 224/42.25 X |
| 1,654,752 | 1/1928 | Raleigh | 70/259 X |
| 1,733,918 | 10/1929 | Spotswood | 296/37.3 |
| 1,887,367 | 11/1932 | Wise | 70/259 |
| 1,921,434 | 8/1933 | Stone | 70/259 |
| 1,955,710 | 4/1934 | Lyon | 224/42.2 |
| 2,038,209 | 4/1936 | Ellenberger | 224/42.2 |
| 2,109,665 | 3/1938 | Ferguson | 296/37.2 |
| 2,134,761 | 11/1938 | Jacobi | 224/42.2 |
| 2,304,515 | 12/1942 | Turnbull | 70/259 X |
| 3,428,230 | 2/1969 | Korf et al. | 224/42.06 |
| 3,709,519 | 1/1973 | Burrows | 150/52 K X |
| 3,870,360 | 3/1975 | Nichols | 224/42.2 X |
| 4,116,490 | 9/1978 | Huff et al. | 70/163 X |
| 4,117,963 | 10/1978 | Luczynski | 224/42.2 X |
| 4,448,049 | 5/1984 | Murray | 70/58 |

Primary Examiner—Stephen Marcus
Assistant Examiner—Robert Petrik
Attorney, Agent, or Firm—Oldham, Oldham & Weber Co.

[57] ABSTRACT

A device for securement of a spare tire and wheel to a vehicle. The device comprises a shroud which covers the exposed portions of the tire, a bolt attached to the shroud and passing through one of the lug nut apertures in the wheel and a nut threadably engaged on the bolt over the wheel. A cable encircling the bolt and passing through the axle aperture of the wheel secures the nut by preventing rotation when a suitable locking mechanism joins the nut and the cable. The invention reduces or eliminates theft of the tire yet provides easy access for removal. The shroud is of rigid construction and may be painted or otherwise decorated to blend with the vehicle's appearance.

4 Claims, 2 Drawing Figures

SPARE TIRE COVER

TECHNICAL FIELD

This invention lies in the art of protective devices for spare tires. Specifically, the invention comprises a design for covering a spare tire on a vehicle which substantially reduces the possibility of theft of the tire.

BACKGROUND ART

Heretofore, a number of designs have been employed for securing a spare tire to a moving vehicle. Early designs consisted of merely attaching the tire to the outer side or rear portion of the vehicle. In more recent years, for reasons of style and with an eye towards reducing theft, the spare has been located in the trunk if one is available. Certain vehicles however, lacking a trunk, must have the spare located on the outside, and as in the past, a simple means of attachment is used together with a cloth or other flexible covering for the sake of appearances. Yet the problem of theft remains. Further, the coverings available often times are not aesthetically pleasing. There is thus a need in the art for a spare tire covering and attachment system which will both complement the vehicle's appearance and greatly reduce the theft of spare tires attached to the vehicle. This need is met by the instant invention.

DISCLOSURE OF THE INVENTION

It is accordingly an aspect of the invention to provide a means for attachment of a spare tire to a vehicle which prevents theft of the tire and is itself theft proof.

Yet another aspect of the invention is to provide a means for attachment, as above, which protects the tire from impact.

Still another aspect of the invention is to provide a means for attachment, as above, which allows quick detachment of the tire.

Still another aspect of the invention is to provide a means for attachment, as above, which integrates well with the vehicle's appearance.

Yet another aspect of the invention is to provide a means for attachment, as above, which utilizes simple and readily available materials of construction.

These and other aspects of the invention, described more fully hereinbelow, are achieved by: a device for securing a tire and wheel to the outside of a vehicle comprising a rigid shroud covering the exposed portions of the tire; a bolt secured to the inner surface of said shroud in an off center manner and having a threaded portion; a loop of flexible cable encircling said bolt; and a nut in threadable communication with said bolt and having an aperture at its extremity for receiving a lock mechanism; wherein a tire, mounted on a wheel, is positioned within said shroud, said bolt passing through a wing nut aperture of said wheel, said flexible cable extending through the axle aperture of said wheel; wherein said nut is threadably engaged onto said bolt over said wheel and wherein said flexible cable and said nut are secured by said locking mechanism, thereby preventing rotation and disengagement of said nut from said bolt.

BRIEF DESCRIPTION OF THE DRAWINGS

The invention is better understood when a reading of the disclosure is accompanied by reference to the drawings, wherein.

BEST MODE FOR CARRYING OUT THE INVENTION

Figure 1:
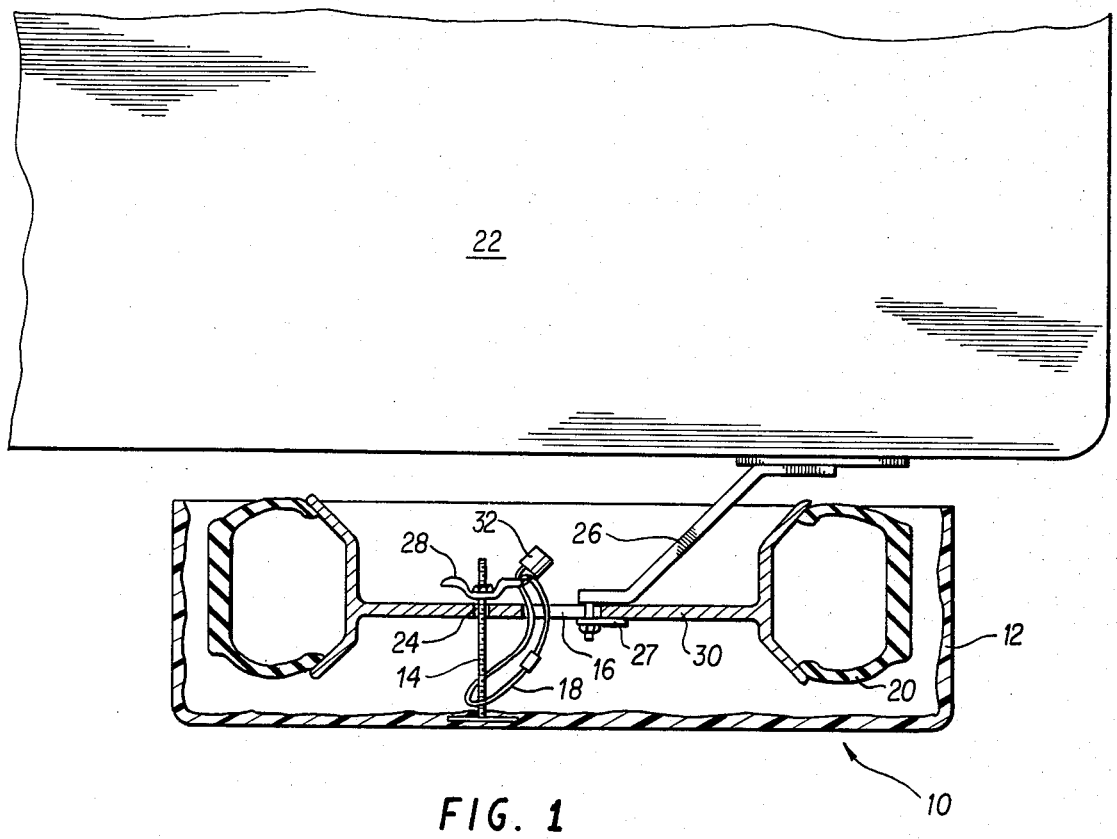
FIG. 1 is a cross sectional view of the invention.
Figure 2:
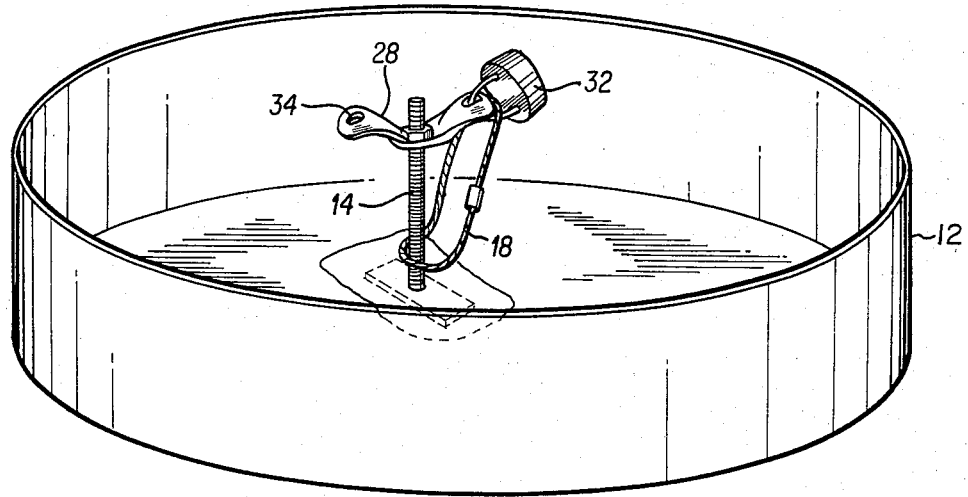
FIG. 2 is an isometric view of the invention.

The invention can best be understood with reference to the figures, where a spare tire cover is generally indicated by the number 10. A shroud 12, covering the exposed portions of a tire 20, has a bolt 14 secured to its inner surface. The bolt is threaded at its unsecured end.

A cable 18 forming a closed loop, encircles the bolt and passes through the axle aperture 16 at the center of a conventional wheel 30. The bolt 14 passes through one of the lug bolt apertures 24 which are ordinarily used to secure the wheel to the vehicle axle. Thus can be seen the purpose of having the bolt mounted off center. Preferably the tire and wheel are positioned in the shroud 12 such that the central portion of the wheel is closest to the flat surface of the shroud.

The bolt 14 subsequently is threadably engaged by a nut 28, which is preferably a butterfly or wing nut having one or more apertures 34 located in its extremetries. Cable 18 extends through the central aperture of wheel 30 and is engaged by a locking mechanism 32 which also engages one of the apertures of the nut 28.

As is readily apparent in the drawings, when in place this arrangement prevents the removal of the nut 34 and hence the removal of the tire 20. When engaged, the nut can only be rotated as far as the cable 18 extends, which is of course a function of its length. Obviously, the cable should not be so long or the diameter of the nut so small, such that the nut can be rotated a complete revolution when engaged by the locking mechanism.

Application of the cover 10 requires that enough room be left between the vehicle surface and the tire so that manipulation of the nut and locking mechanism is readily achieved. Thus the cover is attached to the vehicle 22 by a securement bracket 26 which has a curvate section. This allows the cover 10 to be mounted at a position where the user's hand and arm may readily extend into the area between the tire and the vehicle. The wheel is attached to the bracket 26 by a bolt 27 or similar device which engages the bracket by threaded means.

Removal of the tire 20 requires that the locking mechanism 32 be disengaged and thereafter the nut removed. The locking mechanism may be of any suitable design but is preferably a padlock. It need not be extremely sophisticated due to the inherent difficulty of removal in the close quarters a thief would encounter in the area between the vehicle and the tire. Similarly, due to its location, cable 18 would be difficult to cut and thus could be any one of the common types used, for example, to secure bicycles or other light objects.

Conversely, shroud 12 should be of extremely sturdy, rigid construction to prevent unauthorized removal by applications of brute force and to protect the tire should the vehicle be involved in a traffic collision. Suitable materials of construction include metal such as steel, aluminum and the like as well as the various well known high impact plastics. The requirement of rigidity also insures that the shroud 12 may be readily integrated with the style and decor of the vehicle. For example, the shroud may be lacquered or otherwise spray painted to provide the appearance of factory installation. This characteristic of course contrasts sharply with the commonly used cloth covers of the prior art which generally appear merely utilitarian.

The invention can be used on a variety of vehicle types, including vans, passenger automobiles, four-wheel drive vehicles, and the like. Further, the spare tire cover may be positioned at any convenient location on the vehicle such as on a side panel or roof.

It will be appreciated that changes and modifications may be made to the invention without departing from the scope thereof, as defined in the attached claims. Indeed, only the best mode and the preferred embodiments have herein been disclosed as required by the patent statutes, and no limitations to the invention should be ascribed thereto by reason of this requirement.

What is claimed is:

1. A device for securing a tire and wheel to the outside of a vehicle comprising:
   a rigid shroud covering the exposed portions of the tire;
   a bolt secured to the inner surface of said shroud in an off center manner and having a threaded portion;
   a loop of flexible cable encircling said bolt; and
   a nut in threadable communication with said bolt and having an aperture at its extremity for receiving a lock mechanism;
   wherein a tire, mounted on a wheel, is positioned within said shroud, said bolt passing through a lug nut aperture of said wheel, said flexible cable extending through the axle aperture of said wheel;
   wherein said nut is threadably engaged onto said bolt engaging said wheel; and
   wherein said flexible cable and said nut are secured by said locking mechanism, thereby preventing rotation and disengagement of said nut from said bolt.

2. A device according to claim 1, wherein said nut is a butterfly nut having an aperture at each extremity for receiving said locking mechanism and wherein said locking mechanism is a padlock.

3. A device according to claim 2, wherein said cable is constructed of steel.

4. A device according to claim 3, wherein said vehicle is a van and where said wheel is secured to a door at the rear of said van.

* * * * *